UNITED STATES PATENT OFFICE.

SILAS S. PUTNAM, OF BOSTON, MASSACHUSETTS, ASSIGNOR TO WILLIAM W. WHITMARSH, OF SAME PLACE.

IMPROVEMENT IN SUBSTITUTES FOR COFFEE.

Specification forming part of Letters Patent No. 194,618, dated August 28, 1877; application filed April 30, 1877.

*To all whom it may concern:*

Be it known that I, SILAS S. PUTNAM, of Boston, in the county of Suffolk and State of Massachusetts, have invented an Improved Process of Treating Cereals to be used in Making Table Beverages; and I hereby declare the following to be a full, clear, and exact description thereof.

Table beverages made from simply roasted wheat, rye, and other cereals are objectionable for the reason that when the cereal employed is only moderately roasted the beverage has a raw, starchy taste and an opaque and muddy appearance, with an oily scum which rises to the surface, and when the cereal is roasted sufficiently to entirely change and destroy its starch and glutinous properties and raw taste, and render the beverage made therefrom clear and transparent, it is charred to such an extent as to render the beverage to many unpalatable, and injurious to health.

My invention has for its object to overcome these objections; and consists in steam cooking and drying the cereal previous to roasting it, whereby its starch and glutinous properties are modified and changed, and the cereal is rendered hard and brittle, and the necessity of roasting the cereal sufficiently to char it is obviated.

To enable others skilled in the art to understand and use my invention, I will proceed to describe the manner in which I have carried it out.

The wheat, rye, or other cereal employed is first cooked by the direct action of steam, by which action its starch and glutinous properties are so modified and changed as to produce a superior article for making a table beverage. It is then thoroughly dried by exposure to a moderate degree of heat, after which it is roasted until it assumes a light-brown color, care being taken to avoid charring. It is now ready to be ground for use, and a table beverage made therefrom is exceedingly palatable, nutritious, and very healthful, as it is entirely free from all objectionable properties.

A beverage made from cereals treated in accordance with my invention is clear and highly flavored, and as the charring or carbonizing of the grain is rendered unnecessary by my improved process, the disagreeable taste heretofore found in beverages of this class is avoided and a more palatable and healthy beverage produced.

In carrying out my process I usually cook the cereals in a perforated cylinder which holds about two barrels, said cylinder revolving in a steam-chest. This operation requires about three quarters of an hour under a pressure sufficient to properly cook the individual grains without breaking the testa or outer covering of the cereal, or causing the grains to adhere.

A little experience and observation will enable any person to carry out my process, as the different sizes and varieties of grain will require different pressures of steam to cook them as specified and secure the desired result. The grain thus cooked will dry quickly and perfectly, as the steam-vapor soon passes off, leaving the grain comparatively dry. The grain is then in practice dried in an oven subjected to a sufficient heat to dry it perfectly, when it will be found sound, hard, and brittle, then ground, and when so ground will granulate equal to the best coffee.

Cereals prepared in accordance with my process are not intended to be mixed with or to form an adulteration of coffee, but to be used as a substitute therefor.

What I claim as my invention, and desire to secure by Letters Patent, is—

The process of treating cereals to be used in making table beverages, by steam-cooking and drying the grain previous to and then roasting it, substantially as and for the purpose described.

Witness my hand this 27th day of April, A. D. 1877.

SILAS S. PUTNAM.

In presence of—
P. E. TESCHEMACHER,
N. W. STEARNS.